US009354639B2

(12) United States Patent
Fan (10) Patent No.: US 9,354,639 B2
(45) Date of Patent: May 31, 2016

(54) BALANCED REGULATOR WITH INLET PRESSURE SENSING TUBE (71) Applicant: EMERSON PROCESS MANAGEMENT REGULATOR TECHNOLOGIES, INC., McKinney, TX (US)

(72) Inventor: GuoLei Fan, Sichuan (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 102 days.

(21) Appl. No.: 13/797,205

(22) Filed: Mar. 12, 2013

(65) Prior Publication Data

US 2014/0083530 A1 Mar. 27, 2014

(30) Foreign Application Priority Data

Sep. 21, 2012 (CN) .......................... 2012 1 0353600

(51) Int. Cl.
*F16K 31/12* (2006.01)
*G05D 16/06* (2006.01)
*G05D 16/02* (2006.01)

(52) U.S. Cl.
CPC ............ *G05D 16/0663* (2013.01); *G05D 16/02* (2013.01); *G05D 16/0638* (2013.01); *Y10T 137/7801* (2015.04); *Y10T 137/7825* (2015.04)

(58) Field of Classification Search
CPC  G05D 16/02; G05D 16/0655; G05D 16/0663
USPC .......... 137/505.27, 505.29, 499, 502, 505.28, 137/505.13, 505.41
See application file for complete search history.

(56) References Cited

U.S. PATENT DOCUMENTS

| 2,192,042 | A | * | 2/1940 | Hoffmann | ...................... 137/501 |
| 2,235,304 | A | * | 3/1941 | Toussaint | ......................... 251/45 |
| 2,619,983 | A | * | 12/1952 | Roberts | ...................... 137/484.8 |
| 2,700,983 | A | * | 2/1955 | Bryant | ..................... 137/505.11 |
| 3,392,749 | A | * | 7/1968 | Gneiding et al. | .......... 137/484.6 |
| 4,158,437 | A | * | 6/1979 | Nielsen | ....................... 236/92 B |

(Continued)

FOREIGN PATENT DOCUMENTS

WO    WO-2004/088445  A1    10/2004

OTHER PUBLICATIONS

Partial International Search Report for International Application No. PCT/US2013/060785, mailed Oct. 13, 2014.

(Continued)

*Primary Examiner* — Jessica Cahill
(74) *Attorney, Agent, or Firm* — Marshall, Gerstein & Borun LLP (57) ABSTRACT A balanced pressure regulator includes a valve body having a fluid inlet and a fluid outlet connected by a fluid passageway. A valve seat is disposed within the fluid passageway. A valve plug is at least partially disposed within the fluid passageway, the valve plug interacting with the valve seat to selectively open or close the fluid passageway. A retainer operatively connects the valve plug to a valve stem. A diaphragm separates a chamber from the fluid passageway and a balancing passage fluidly connects the fluid passageway with the chamber. A balancing tube extends outward, away from the retainer, fluidly connecting the fluid passageway with the balancing passage.

20 Claims, 5 Drawing Sheets

(56) References Cited

U.S. PATENT DOCUMENTS

| | | | |
|---|---|---|---|
| 5,806,558 A | 9/1998 | Greverath | |
| 6,796,326 B2* | 9/2004 | Bayer | 137/505.18 |
| 7,157,168 B2* | 1/2007 | Nakajima et al. | 429/444 |
| 2004/0261860 A1 | 12/2004 | Kirchner et al. | |
| 2008/0257418 A1* | 10/2008 | Kranz et al. | 137/315.13 |
| 2009/0260697 A1 | 10/2009 | Mevius et al. | |
| 2009/0261281 A1 | 10/2009 | Mevius et al. | |
| 2010/0071786 A1* | 3/2010 | Hawkins et al. | 137/485 |
| 2010/0269925 A1* | 10/2010 | Roper et al. | 137/505.37 |
| 2011/0068284 A1* | 3/2011 | Jorgensen | 251/46 |
| 2011/0174381 A1* | 7/2011 | Foust et al. | 137/1 |

OTHER PUBLICATIONS

Search Report for International application No. PCT/US2013/060785, mailed Apr. 23, 2015.

Written Opinion for International application No. PCT/US2013/060785, mailed Apr. 23, 2015.

Preliminary Report on Patentability for International application No. PCT/US2013/060785, mailed Apr. 28, 2015.

* cited by examiner

BALANCED REGULATOR WITH INLET PRESSURE SENSING TUBE

FIELD OF THE DISCLOSURE

The disclosure generally relates to balanced pressure regulators and more specifically to a balanced pressure regulators having an inlet pressure sensing tube that senses inlet pressure upstream of a valve seat.

BACKGROUND OF THE DISCLOSURE

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

To address the decaying inlet characteristic in higher flow applications, balanced pressure regulators were developed. In the balanced pressure regulator, a portion of the upstream pressure is diverted to act on a downstream portion of the valve plug. Thus, the valve plug is "balanced," having the same fluid pressure act on both upstream and downstream portions of the valve plug. In this way, the decaying inlet characteristic is eliminated (or greatly reduced) because there is no difference in the fluid forces acting on valve plug surfaces both upstream and downstream of the valve seat that would tend to force the valve plug towards the closed position. In other words, the valve plug itself generates very little, or no opening/closing forces due to fluid pressures.

In diaphragm-type pressure regulators, higher pressure fluid from an upstream or inlet side of the valve plug may be vented through the valve plug to an opposite side of the diaphragm to balance forces on the valve plug, similar to the balanced regulators described above. Typically, this balancing of fluid forces is accomplished by incorporating one or more vent channels or ports that extend through the valve plug from the inlet side to an actuator side of the diaphragm.

Figure 1:
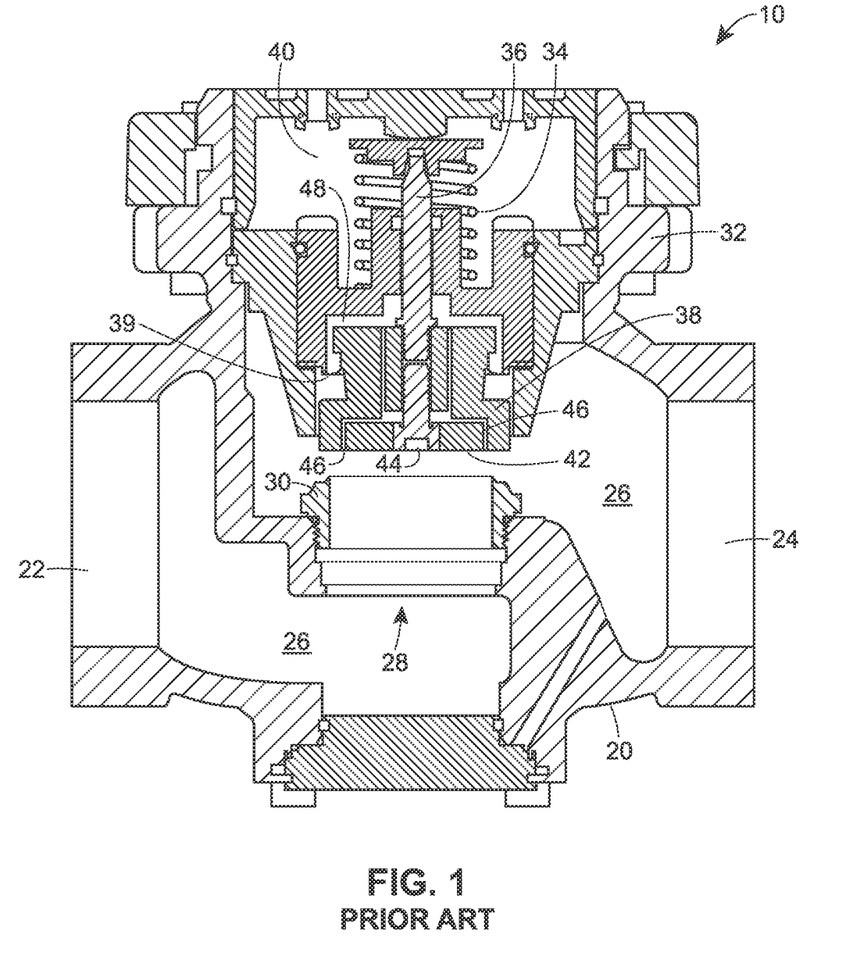
FIG. 1 is a cross-sectional view of a prior art balanced regulator.

A typical diaphragm-type pressure regulator is illustrated in FIG. 1. The pressure regulator 10 includes a valve body 20 having a fluid inlet 22 and a fluid outlet 24 that are fluidly connected by a passage 26. The passage 26 includes a throat 28 in which a valve seat 30 is disposed. A bonnet 32 houses a load spring 34 that is connected to a valve stem 36. The valve stem 36 is operatively attached to a valve plug 38. The valve plug 38 interacts with the valve seat 30 to control fluid flow through the valve body 20 from the inlet 22 to the outlet 24.

A diaphragm 39 is connected to the bonnet 32 and the valve plug 38. The diaphragm 39 separates the passage 26 from a cavity 40 in the bonnet 32 that contains the load spring 34. The diaphragm 39 is responsive to pressure differences between the passage 26 and the cavity 40.

A retainer 42 is attached to the valve stem 36 and retains the valve plug 38 on the valve stem 36. The retainer may include one or more fasteners 44, such as a nut, which are attached to the valve stem 36. One or more balancing passages or channels 46 fluidly connect the passage 26 with a chamber 48 located between the valve plug 38 and the cavity 40. Fluid forces on the valve plug 38 are balanced by fluid moving through the balancing channels 46.

One problem with diaphragm-type balanced regulators, such as the balanced regulator illustrated in FIG. 1 is that they suffer from instability at high inlet pressures. In other words, at high inlet pressures, the pressure balancing is difficult due to flow characteristics through the balancing passages or channels 46. This causes unbalanced forces to act on the valve plug 38, which may cause the valve plug 38 to wildly or erratically cycle within the valve body 20, which may lead to erratic downstream pressure.

SUMMARY

In accordance with one exemplary aspect of the present invention, a balanced pressure regulator includes a valve body having a fluid inlet and a fluid outlet connected by a fluid passageway. A valve seat is disposed within the fluid passageway. A valve plug is at least partially disposed within the fluid passageway, the valve plug interacting with the valve seat to selectively open or close the fluid passageway. A retainer operatively connects the valve plug to a valve stem. A diaphragm separates a chamber from the fluid passageway and a balancing channel fluidly connects the fluid passageway with the chamber. A balancing tube extends outward, away from the retainer, fluidly connecting the fluid passageway with the balancing channel.

In another exemplary aspect of the present invention, a balanced plug assembly includes a sleeve, a valve plug disposed within the sleeve, the valve plug including a balancing channel, and a retainer for operatively connecting the valve plug to a valve stem. A balancing tube extends outward, away from the retainer, the balancing tube being fluidly connected to the balancing channel.

In further accordance with any one or more of the foregoing aspects, a balanced pressure regulator and/or a balanced plug assembly may further include any one or more of the following preferred forms.

In some preferred forms, the balanced pressure regulator and/or the balanced plug assembly may include an opening in the balancing tube that is located upstream of a seating surface of the valve seat, the opening may include a chamfered surface or a plurality of openings disposed circumferentially about the balancing tube. The opening may have one of a circular, an oval, a square, a rectangular, a triangular, and a slot shape. The balancing tube may have a length of between 50% and 150% of a length of the valve plug, preferably about % 75 of the length of the valve plug.

In other preferred forms, the balanced pressure regulator and/or the balanced plug assembly may include a bend in the balancing tube, the bend having an angle of between 1° and 179°, preferably between 30° and 150°, and more preferably between 60° and 120°.

In yet other preferred forms, the balanced pressure regulator and/or the balanced plug assembly may include a seal disposed between the retainer and the valve plug.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Referring now to the drawings and with specific reference to FIGS. 2-5, a balanced pressure regulator is generally referred to by reference numeral 110, 210. Where the balanced pressure regulators of FIGS. 2-5 include elements that correspond to the elements of the balanced pressure regulator of FIG. 1, those elements will be numbered similarly, the only difference being that the reference numerals of FIGS. 2-5 being increased by a multiple of 100. For example, corresponding elements of FIGS. 2 and 3 will be numbered exactly 100 greater than the corresponding elements illustrated in FIG. 1. Similarly, corresponding elements of FIGS. 4 and 5 will be numbered exactly 200 greater than the corresponding elements illustrated in FIG. 1.

Figure 2:
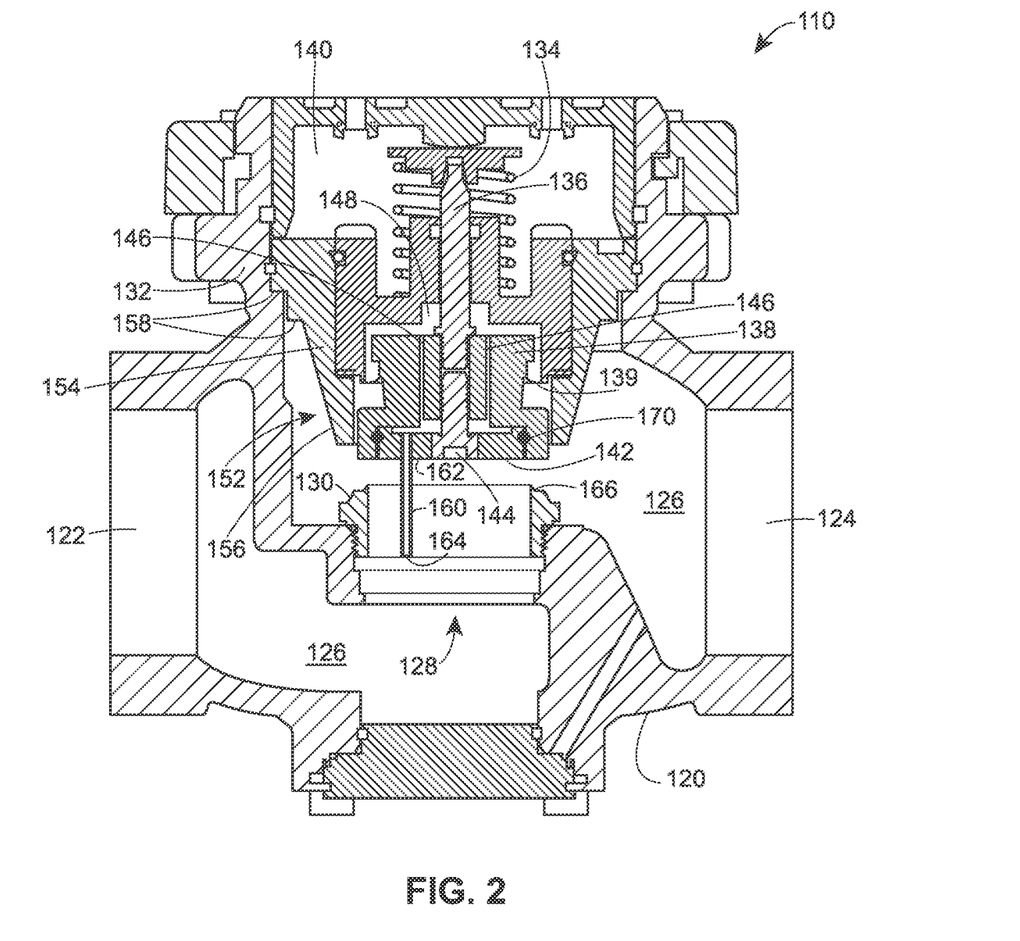
FIG. 2 is a cross-sectional view of a balanced regulator constructed in accordance with the teachings of the disclosure.
Figure 3:
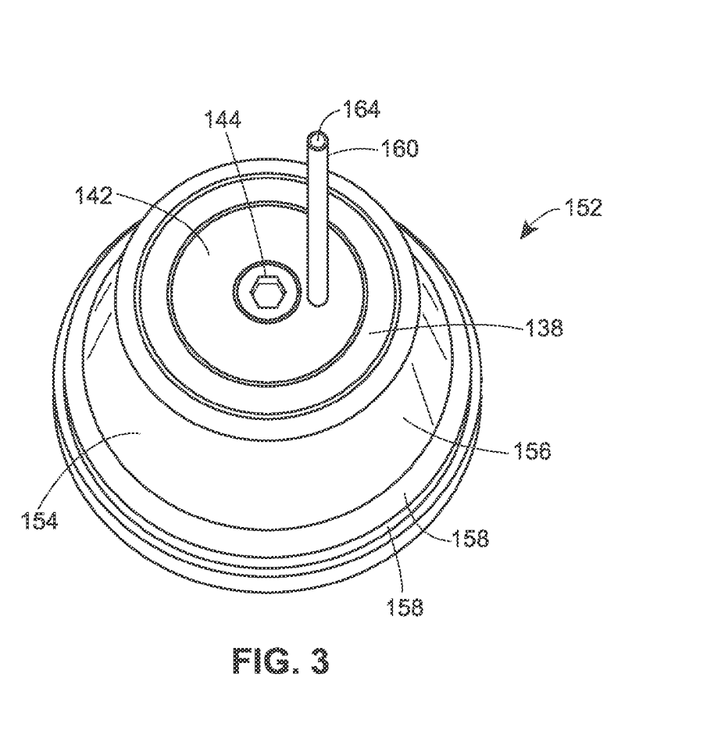
FIG. 3 is a perspective view of a valve plug and a retainer of the balanced regulator of FIG. 2.

Turning now to FIGS. 2 and 3, the balanced pressure regulator 110 includes a valve body 120 having a fluid inlet 122 and a fluid outlet 124 connected by a fluid passageway 126. The fluid passageway 126 includes a throat 128 and a valve seat 130 disposed in the throat 128. A bonnet 132 houses a load spring 134 that is connected to a valve stem 136. The valve stem 136 is operatively attached to a valve plug 138. The valve plug 138 interacts with the valve seat 130 to control fluid flow through the valve body 120 from the inlet 122 to the outlet 124.

A balanced plug assembly 152 includes a sleeve 154, the valve plug 138, and a retainer 142. The sleeve 154 has a hollow bore that retains and guides the valve plug 138 as the valve plug 138 reciprocates within the valve body 120 to control fluid flow. The sleeve 154 may have an angled outer surface 156 to enhance clearance within the valve body 120 and/or to enhance assembly of the balanced pressure regulator 110. The sleeve 154 may also include one or more outer annular shoulders 158 that may be clamped between the bonnet 132 and the valve body 120 to locate and retain the sleeve 154 within the valve body 120.

A diaphragm 139 is connected to the sleeve 154 and the valve plug 138. The diaphragm 139 separates the passage 126 from a cavity 140 in the bonnet 132 that contains the load spring 134. The diaphragm 139 is responsive to pressure differences between the passage 126 and the cavity 140.

The retainer 142 is attached to the valve stem 136 and operatively connects the valve plug 138 to the valve stem 136. The retainer 142 may include one or more fasteners 144, such as a nut, which are operatively connected to the valve stem 136. One or more balancing passages or channels 146 fluidly connect the fluid passageway 126 with a chamber 148 located between the valve plug 138 and the cavity 140. Fluid forces on the valve plug 138 are balanced by fluid moving through the balancing channels 146 from higher pressure regions to lower pressure regions.

Figure 6:
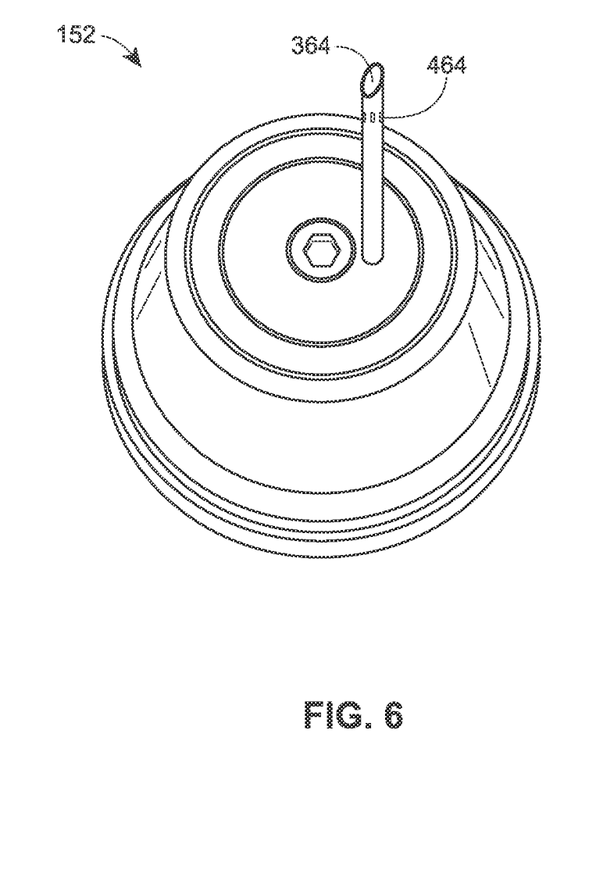
FIG. 6 is a perspective view of an alternative embodiment of the valve plug and retainer of FIG. 3.

A balancing tube 160 extends outward, away from a bottom 162 of the retainer 142. The balancing tube 160 is fluidly connected to at least one balancing channel 146. The balancing tube 160 extends away from the bottom 162 of the retainer 142 sufficiently so that an opening 164 in the balancing tube 160 is located upstream of a seating surface 166 (that is contacted by the valve plug 138 to prevent fluid flow through the valve body 120). In other embodiments, the opening 164 may include a chamfered opening surface 364, or a surface that otherwise directs the opening into the direction of fluid flow from the inlet 122, as illustrated in FIG. 6. In yet other embodiments, one or more openings 464 may be distributed circumferentially around the balancing tube 160, as illustrated in FIG. 6. In such embodiments, the openings may be generally rectangular in shape. In other embodiments, the openings may take on virtually any other shape, such as circle, oval, square, triangle, slot, irregular, or any other shape. Particular shapes may be selected to aid in directing local fluid flow into the openings at different locations within the passageway 126. In yet other embodiments, the balancing tube 160 may include a combination of openings 164, chamfered openings 364, and circumferentially disposed openings 464.

In yet other embodiments, the balancing tube 160 may have a length that is between 50% and 150% of a length of the valve plug 138. In the embodiment illustrated in FIG. 2, the balancing tube 160 has a length that is about 75% of the length of the valve plug.

The balancing tube 160 extends far enough into the throat 128 or fluid passageway 126 to reach a less turbulent region of fluid as compared to turbulence in the region immediately surrounding the valve plug 138 and the valve seat 130. The less turbulent regions of fluid reduce or eliminate boost pressures caused by turbulent flow found in prior balanced regulators. These boost pressures were found by the inventor to be at least one cause of the instability of prior balanced regulators at high inlet pressures.

The balanced plug assembly 152 may optionally include a seal or o-ring 170 disposed between the retainer 142 and the valve plug 138 to prevent turbulent flow in the vicinity of the bottom 162 of the retainer 142 from entering the balancing passages or channels 146.

Figure 4:
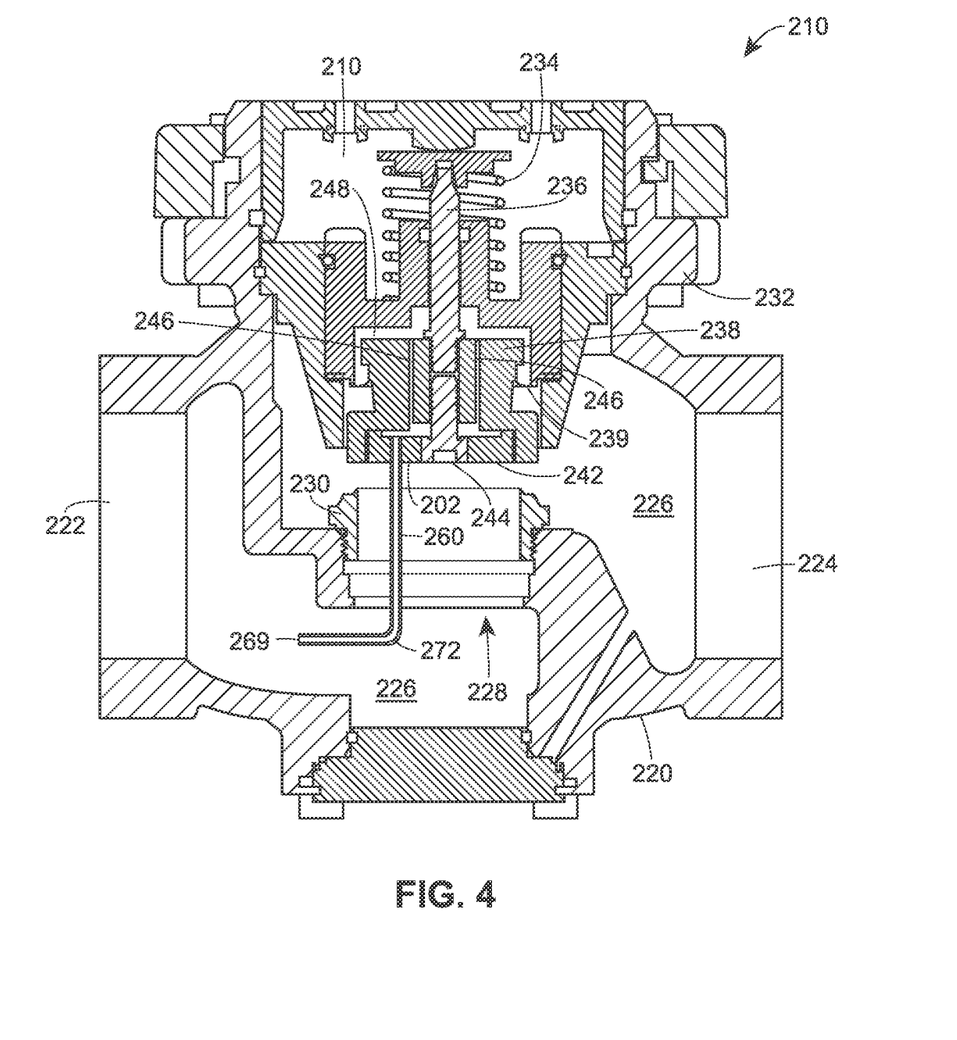
FIG. 4 is a cross-sectional view of an alternate embodiment of a balanced regulator constructed in accordance with the teachings of the disclosure.
Figure 5:
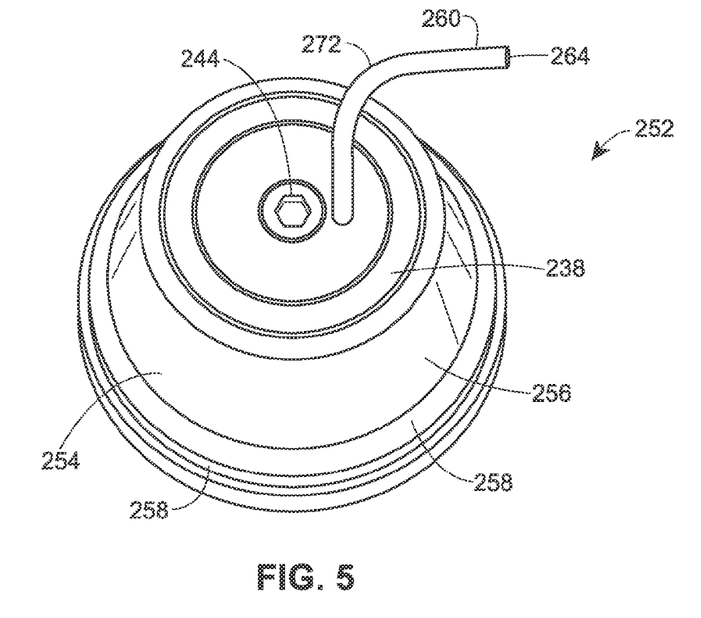
FIG. 5 is a perspective view of a valve plug and a retainer of the balanced regulator of FIG. 4.

Turning now to FIG. 4, the balanced pressure regulator 210 includes a valve body 220 having a fluid inlet 222 and a fluid outlet 224 connected by a fluid passageway 226. The fluid passageway 226 includes a throat 228 and a valve seat 230 disposed in the throat. A bonnet 232 houses a load spring 234 that is connected to a valve stem 236. The valve stem 236 is operatively attached to a valve plug 238. The valve plug 238 interacts with the valve seat 230 to control fluid flow through the valve body 220 from the inlet 222 to the outlet 224.

A diaphragm 239 is connected to the bonnet 232 and the valve plug 238. The diaphragm 239 separates the passage 226 from a cavity 240 in the bonnet 232 that contains the load spring 234. The diaphragm 239 is responsive to pressure differences between the passage 226 and the cavity 240.

A retainer 242 is attached to the valve stem 236 and retains the valve plug 238 on the valve stem 236. The retainer 242 may include one or more fasteners 244, such as a nut, which are attached to the valve stem 236. One or more balancing passages or channels 246 fluidly connect the passage 226 with a chamber 248 located between the valve plug 238 and the cavity 240. Fluid forces on the valve plug 238 are balanced by fluid moving through the balancing channels 246 from higher pressure regions to lower pressure regions.

Similar to the embodiment illustrated in FIGS. 2 and 3, a balancing tube 260 may extend outward from a bottom surface 262 of the retainer 242. In other embodiments, the balancing tube 260 may extend outward from a bottom of the valve plug. However, in the embodiment illustrated in FIGS. 4 and 5, the balancing tube 260 includes a bend 272 that directs an opening 264 of the balancing tube into a direction of less turbulent fluid flow from the inlet 222. The balancing tube 260 may extend a sufficient distance to locate the opening 264 outside of the throat 228 and towards the inlet 222 of the fluid passageway 226. The bend 270 may be approximately 90° in the embodiment illustrated in FIGS. 4 and 5. In other embodiments, the bend may range from 1° to 179°, preferably from 30° to 150°, and even more preferably from 60° to 120°, depending on the relative orientation between the inlet 222 and the throat 228. The bend 270 may be used to precisely orient the opening 264 into the oncoming fluid flow to enhance delivery of fluid into the balancing channels 246.

Any of the embodiments of balanced regulators or balanced plug assemblies disclosed herein may be used to advantageously direct less turbulent fluid flow from a region upstream of a seating surface of a valve seat into one or more balancing channels disposed within a valve plug. In this manner, pressure boosting due to turbulent fluid flow may be decreased or eliminated, making the disclosed balanced pressure regulators less prone to instability at high inlet pressures.

As opposed to prior art balanced regulators, the balanced regulators and balanced plug assemblies of the present disclosure may have significantly lower risks of instability, particularly at high inlet pressures. As a result, the disclosed balanced pressure regulators and balanced plug assemblies enhance downstream fluid delivery and/or reduce premature failure of valve components due to unnecessary reciprocation of the valve plug.

Although certain balanced regulators and balanced plug assemblies have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A balanced pressure regulator, comprising:
a valve body having a fluid inlet and a fluid outlet connected by a fluid passageway;
a valve seat disposed within the fluid passageway;
a valve plug at least partially disposed within the fluid passageway, the valve plug interacting with the valve seat to selectively open or close the fluid passageway;
a retainer operatively connecting the valve plug to a valve stem;
a diaphragm separating a chamber from the fluid passageway;
a balancing passage that fluidly connects the fluid passageway with the chamber; and
a balancing tube extending outward, away from the retainer, the balancing tube fluidly connecting the fluid passageway with the balancing passage through the retainer, the balancing tube being radially offset from a center of the retainer, but radially inward from an edge of the retainer,
wherein the balancing tube extends from a bottom of the retainer and the balancing tube extends through the valve seat and into a throat of the fluid passageway upstream of a seating surface on the valve seat.

2. The balanced pressure regulator of claim 1, further including a seal disposed between the retainer and the valve plug.

3. The balanced pressure regulator of claim 1, wherein the balancing tube includes an opening that is located upstream of a seating surface of the valve seat.

4. The balanced pressure regulator of claim 3, wherein the balancing tube has a length of between 50% and 150% of a length of the valve plug.

5. The balanced pressure regulator of claim 3, wherein the balancing tube has a length of approximately 75% of a length of the valve plug.

6. The balanced pressure regulator of claim 3, wherein the opening includes a chamfered surface.

7. The balanced pressure regulator of claim 3, further comprising a plurality of openings located circumferentially around the balancing tube.

8. The balanced pressure regulator of claim 3, wherein the opening has a shape that is one of circular, oval, square, rectangular, triangular, and slot.

9. The balanced pressure regulator of claim 3, wherein the balancing tube includes a bend that locates an opening of the balancing tube outside of the throat towards the fluid inlet and that directs an opening of the balancing tube in an upstream direction towards the fluid inlet.

10. The balanced pressure regulator of claim 9, wherein the bend has an angle of between 1° and 179°.

11. A balanced plug assembly for a balanced pressure regulator, the balanced plug assembly comprising:
  a sleeve having a hollow bore;
  a valve plug disposed within the hollow bore of the sleeve, the valve plug being retained and guided by the sleeve, the valve plug including a balancing channel;
  a retainer for operatively connecting the valve plug to a valve stem; and
  a balancing tube extending outward, away from the retainer, the balancing tube being fluidly connected to the balancing channel through the retainer, and the balancing tube being radially offset from a center of the retainer, but radially inward from an edge of the retainer,
  wherein the balancing tube extends from a bottom of the retainer and the balancing tube extends through a valve seat and into a throat of a fluid passageway.

12. The balanced plug assembly of claim 11, further including a seal disposed between the retainer and the valve plug.

13. The balanced plug assembly of claim 11, wherein the sleeve includes an angled outer surface.

14. The balanced plug assembly of claim 11, wherein the balancing tube includes an opening.

15. The balanced plug assembly of claim 14, wherein the balancing tube has a length of between 50% and 150% of a length of the valve plug.

16. The balanced plug assembly of claim 14, wherein the opening includes a chamfered surface.

17. The balanced plug assembly of claim 14, further comprising a plurality of openings located circumferentially around the balancing tube.

18. The balanced plug assembly of claim 14, wherein the opening has a shape that is one of circular, oval, square, rectangular, triangular, and slot.

19. The balanced plug assembly of claim 14, wherein the balancing tube includes a bend that locates an opening of the balancing tube outside of the throat towards a fluid inlet and that directs an opening of the balancing tube in an upstream direction towards the fluid inlet.

20. The balanced plug assembly of claim 19, wherein the bend has an angle of between 1° and 179°.

* * * * *